United States Patent
O'Halloran et al.

(10) Patent No.: US 8,523,095 B2
(45) Date of Patent: Sep. 3, 2013

(54) FEED CONTROL ARRANGEMENT

(75) Inventors: James L. O'Halloran, Pella, IA (US);
Edwin N. Galloway, Pella, IA (US);
Jeffrey D. Bradley, Pella, IA (US); Ivan Brand, Holland, MI (US)

(73) Assignee: Vermeer Manufacturing Company, Pella, IA (US)

( * ) Notice: Subject to any disclaimer, the term of this patent is extended or adjusted under 35 U.S.C. 154(b) by 589 days.

(21) Appl. No.: 12/599,636

(22) PCT Filed: May 1, 2008

(86) PCT No.: PCT/US2008/062243
§ 371 (c)(1),
(2), (4) Date: Nov. 23, 2010

(87) PCT Pub. No.: WO2008/140958
PCT Pub. Date: Nov. 20, 2008

(65) Prior Publication Data
US 2011/0073691 A1 Mar. 31, 2011

Related U.S. Application Data

(60) Provisional application No. 60/928,935, filed on May 10, 2007.

(51) Int. Cl.
*B02C 25/00* (2006.01)
(52) U.S. Cl.
USPC .............................. 241/34; 241/37.5; 241/92
(58) Field of Classification Search
USPC ........................................... 241/37.5, 92, 34
See application file for complete search history.

(56) References Cited

U.S. PATENT DOCUMENTS

| | | |
|---|---|---|
| 2,561,069 A | 7/1951 | Peterson |
| 2,821,345 A | 1/1958 | Donath |
| 2,927,740 A | 3/1960 | Berk |
| 3,182,917 A | 5/1965 | Tamny et al. |
| 3,516,539 A | 6/1970 | Gulstrom et al. |
| 3,523,411 A | 8/1970 | Waldrop et al. |
| 3,701,483 A | 10/1972 | Crosby et al. |
| 3,825,192 A | 7/1974 | Knight |
| 3,863,848 A | 2/1975 | Mashuda |
| 3,944,146 A | 3/1976 | Stockmann et al. |
| 3,955,765 A | 5/1976 | Gaitten |
| 3,990,568 A | 11/1976 | Wilson, Sr. |
| 4,069,911 A | 1/1978 | Ray |
| 4,073,377 A | 2/1978 | Stoessel et al. |
| 4,078,590 A | 3/1978 | Smith |

(Continued)

FOREIGN PATENT DOCUMENTS

| | | |
|---|---|---|
| JP | 2004167797 A | 6/2004 |
| WO | WO 98/15395 A | 4/1998 |

OTHER PUBLICATIONS

Peterson 4710 Track-Mounted Recycler Preliminary Manual, cover page, pp. 11, 12, 138, 199, 200 and 219 (Aug. 2004).

(Continued)

*Primary Examiner* — Mark Rosenbaum
(74) *Attorney, Agent, or Firm* — Merchant & Gould PC

(57) ABSTRACT

A feed control arrangement for controlling the infeed of materials into a machine such as a wood chipper is provided. The feed control arrangement includes a control lever and an emergency stop bar. The control lever and emergency stop bar can be selectively activated to effectively control the infeed of material into the machine.

19 Claims, 12 Drawing Sheets

(56) References Cited

U.S. PATENT DOCUMENTS

| | | | |
|---|---|---|---|
| 4,078,592 A | 3/1978 | Standal |
| 4,223,845 A | 9/1980 | Selonke et al. |
| 4,338,985 A | 7/1982 | Smith et al. |
| 4,340,137 A | 7/1982 | Foster |
| 4,510,981 A | 4/1985 | Biller |
| 4,515,318 A | 5/1985 | Savonjousi |
| 4,598,745 A | 7/1986 | Parviainen |
| 4,625,924 A | 12/1986 | Killinger |
| 4,632,318 A | 12/1986 | Hyuga |
| 4,633,776 A | 1/1987 | Blackmore et al. |
| 4,799,625 A | 1/1989 | Weaver, Jr. et al. |
| 4,805,676 A | 2/1989 | Aikins |
| 4,898,221 A | 2/1990 | Eriksson |
| 4,907,632 A | 3/1990 | Reuter |
| 4,927,088 A | 5/1990 | Brewer |
| 4,934,612 A | 6/1990 | Johnson |
| 4,943,259 A | 7/1990 | Felstehausen |
| 5,020,579 A | 6/1991 | Strong |
| 5,041,057 A | 8/1991 | Felstehausen |
| 5,062,571 A | 11/1991 | Arno et al. |
| 5,078,327 A | 1/1992 | Kemetter |
| 5,088,532 A | 2/1992 | Eggers et al. |
| 5,137,219 A | 8/1992 | Morey |
| 5,205,496 A | 4/1993 | O'Donnell et al. |
| 5,230,475 A | 7/1993 | Gerner |
| 5,293,479 A | 3/1994 | Quintero et al. |
| 5,417,265 A | 5/1995 | Davenport et al. |
| 5,472,146 A | 12/1995 | Doppstadt |
| 5,526,885 A | 6/1996 | Kuvshinov et al. |
| 5,676,238 A | 10/1997 | Saastamo |
| 5,881,959 A | 3/1999 | Hadjinian et al. |
| 5,924,637 A | 7/1999 | Niederholtmeyer |
| 5,947,395 A | 9/1999 | Peterson et al. |
| 6,026,871 A | 2/2000 | Chapman |
| 6,293,479 B1 | 9/2001 | Kaczmarski et al. |
| 6,318,056 B1 | 11/2001 | Rauch et al. |
| 6,357,684 B1 | 3/2002 | Morey |
| 6,641,065 B2 | 11/2003 | Bardos et al. |
| 6,722,596 B1 | 4/2004 | Morey |
| 6,729,567 B1 | 5/2004 | Morey |
| 6,769,836 B2 | 8/2004 | Lloyd |
| 6,814,320 B1 | 11/2004 | Morey et al. |
| 6,830,204 B1 | 12/2004 | Morey |
| 6,843,435 B2 | 1/2005 | Verhoef et al. |
| 6,853,531 B2 | 2/2005 | Mather et al. |
| 6,929,202 B2 | 8/2005 | Haikkala et al. |
| 6,955,310 B1 | 10/2005 | Morey |
| 6,978,955 B2 | 12/2005 | Verhoef et al. |
| 7,011,258 B2 | 3/2006 | O'Halloran et al. |
| 7,040,558 B2 | 5/2006 | Stelter et al. |
| 7,044,409 B2 | 5/2006 | Stelter et al. |
| 7,048,212 B2 | 5/2006 | Carey |
| 7,070,132 B1 | 7/2006 | Gassman |
| 7,077,345 B2 | 7/2006 | Byram et al. |
| 7,441,718 B2 | 10/2008 | Seaman et al. |
| 7,481,386 B2 | 1/2009 | Hartzler et al. |
| 7,637,444 B2 | 12/2009 | Stelter et al. |
| 7,874,504 B2 | 1/2011 | Chapman et al. |
| 2002/0070301 A1 | 6/2002 | Stelter et al. |
| 2002/0139877 A1 | 10/2002 | Beam |
| 2003/0111566 A1 | 6/2003 | Seaman et al. |
| 2006/0196981 A1 | 9/2006 | Stelter et al. |
| 2007/0001038 A1 | 1/2007 | Bouwers et al. |
| 2007/0069051 A1 | 3/2007 | Hartzler et al. |
| 2007/0108323 A1 | 5/2007 | Chapman et al. |
| 2011/0006142 A1 | 1/2011 | O'Halloran et al. |

OTHER PUBLICATIONS

RC6D Brush Chipper, 6" Capacity Disc, Rayco Manufacturing, Inc., 6 pages (Copyright 2006).

RC12D Brush Chipper, 12" Capacity Disc, Rayco Manufacturing, Inc., 7 pages (Copyright 2006).

RC12 Brush Chipper, 12" Capacity Drum, Rayco Manufacturing, Inc., 6 pages (Copyright 2006).

RC20 Brush Chipper, 20" Capacity Drum, Rayco Manufacturing, Inc., 6 pages (Copyright 2006).

Welcome to Rayco Manufacturing's Used Machines, http://www.raycopreowned.com/11/01/2006, 4 pages (Date Printed Nov. 1, 2006).

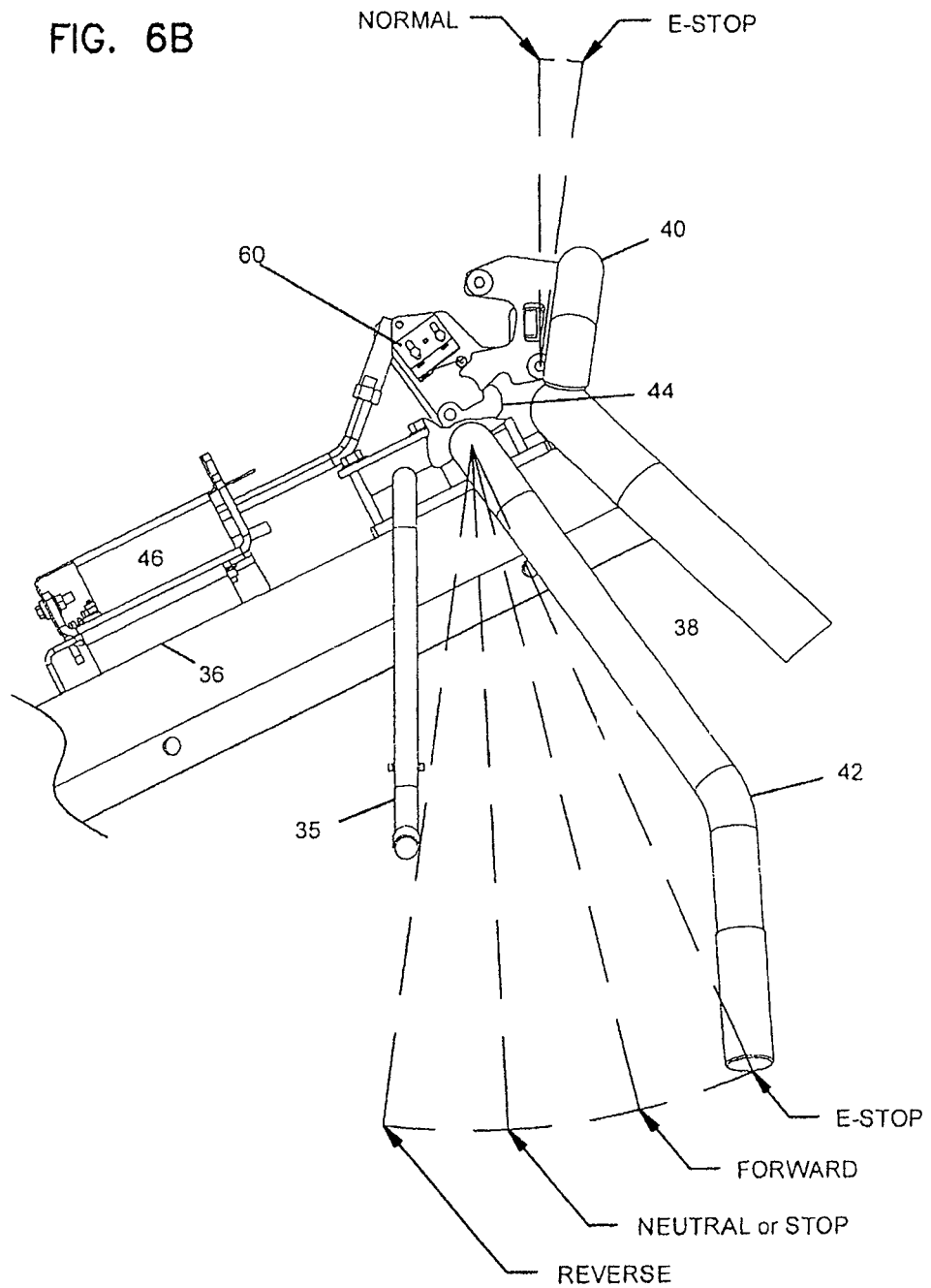

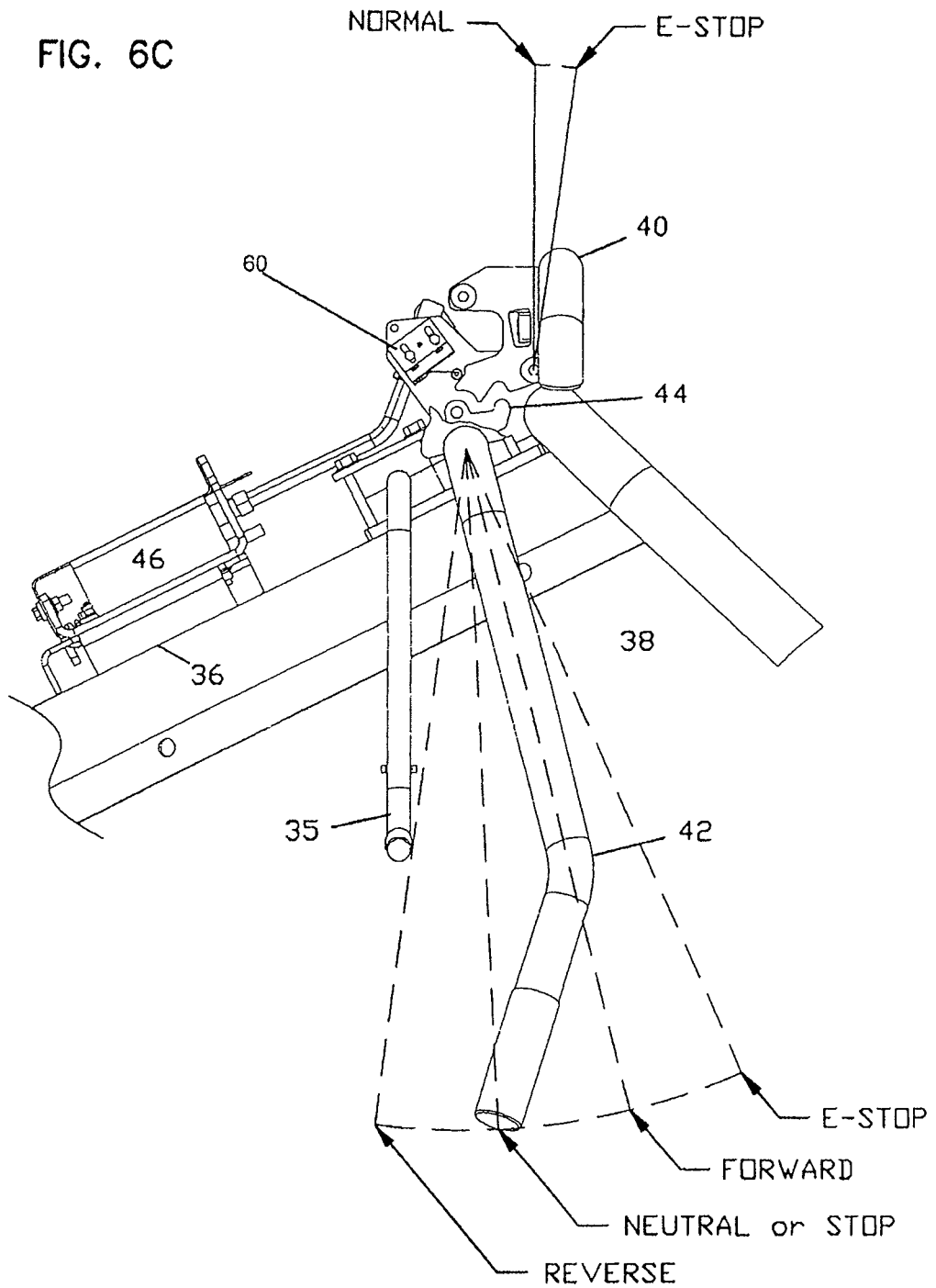

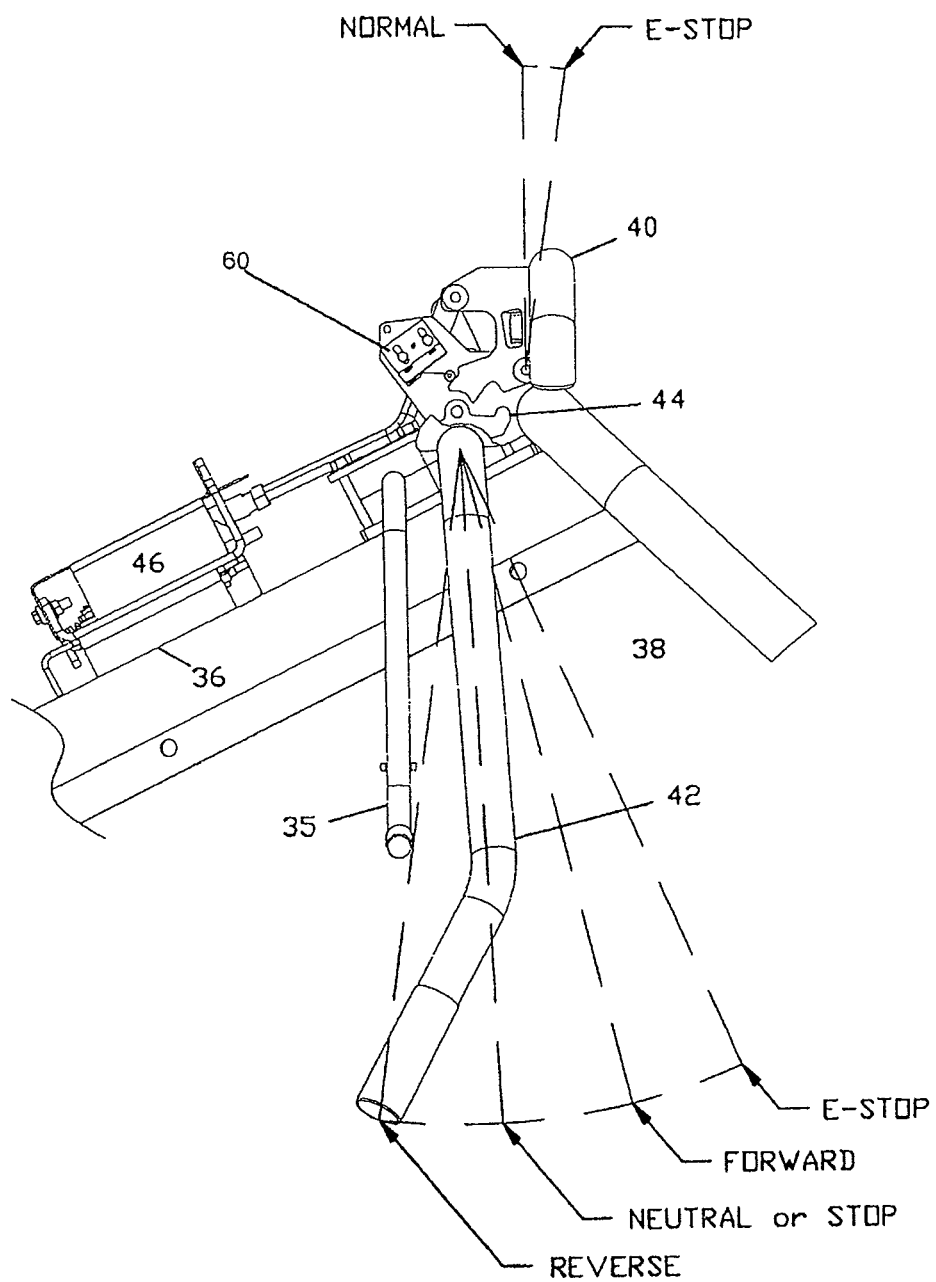

FEED CONTROL ARRANGEMENT

This application is a National Stage Application of PCT/US2008/062243, filed May 1, 2008 in the name of Vermeer Manufacturing Company, a U.S. national corporation, applicant for the designation of all countries except the US, and James L. O'Halloran, Edwin N. Galloway, Jeffrey D. Bradley and Ivan Brand, citizens of the U.S., applicants for the designation of the US only, and claims priority to U.S. Provisional Patent Application Ser. No. 60/928,935, filed May 10, 2007, and which applications are incorporated herein by reference. To the extent appropriate, a claim of priority is made to each of the above disclosed applications.

TECHNICAL FIELD

The present invention relates generally to feed control arrangements and, more particularly, to feed control arrangements of chippers.

BACKGROUND

Feed control arrangements are found in many types of machines. For example, they can be found in chippers, which are machines used to reduce branches, trees, brush, and other bulk wood products into small chips. A chipper typically includes an infeed chute for guiding wood products into the chipper, a chipping mechanism, feed system, and a feed control arrangement.

Through the operation of the feed system, products to be chipped are brought into contact with the chipping mechanism, which grinds, flails, or cuts the wood products into small pieces. The feed system typically includes feed rollers, which are configured to grab and pull material to be chipped into the chipper. For a discussion regarding the desirability of controlling the rotation of feed rollers (e.g., to overcome jams) see U.S. Pat. No. 7,040,558 to Stelter et al. which is incorporated herein by reference.

Several known feed control arrangements are described in the following patents: U.S. Pat. No. 7,044,409 to Stelter et al.; U.S. Pat. No. 7,011,258 to O'Halloran et al.; and U.S. Pat. No. 7,083,129 to Beam, III. The feed control arrangement of U.S. Pat. No. 7,044,409 to Stelter et al. is shown in FIGS. 1A and 1B. The feed table 11 of FIGS. 1A and 1B includes a bottom surface 21, opposed side walls 22, 23, and a feed control bar 26 that is shown pivotally attached at rod 27 to the chipper frame 122.

If the operator wishes to stop the feed rollers 16, the operator would pull back the feed control bar 26 (i.e., pull in a direction away from the feed rollers 16). If the operator wishes to reverse the feed rollers 16, the operator would push the feed control bar 26 forwardly (i.e., towards the feed rollers 16). Due to the position and configuration of the feed control bar 26, it can be activated by the operator or by the material being pulled into the chipper. It is not desirable that the feed control bar 26 be activated by material being pulled into the chipper. Accordingly, there is a need in the art for a feed control system that is not easily activated by material being pulled into the chipper. More generally, there is a need in the art for a feed control system that enables the operator to more effectively control the feed rollers.

SUMMARY

The present disclosure relates to a feed control system that is configured for controlling a feed system. In one embodiment of the disclosure, the feed control arrangement is configured such that an operator can conveniently control the feed rollers by activating a control lever positioned adjacent a feed chute. The feed control arrangement of the present disclosure is configured to minimize the likelihood of it being activated by the material being pulled into the feed chute.

BRIEF DESCRIPTION OF THE DRAWINGS

FIGS. 6A-D are a portion of the feed control arrangement of FIG. 2 shown in various positions;

DETAILED DESCRIPTION

Figure 1A:
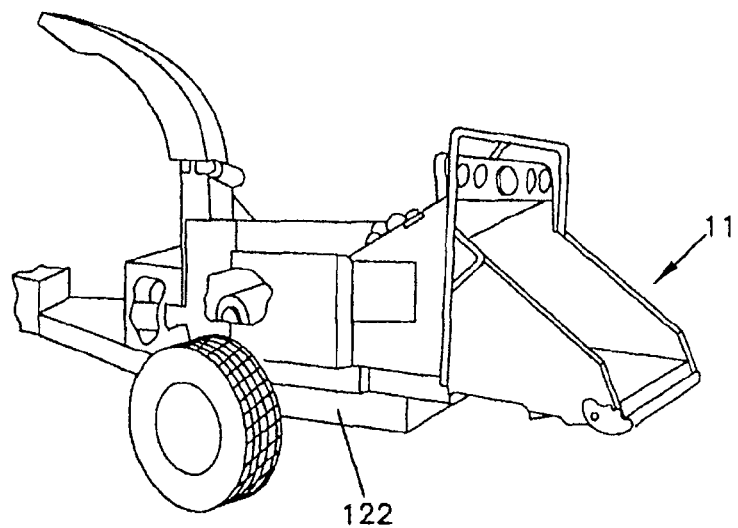
FIG. 1A is a perspective view of a chipper including a prior art feed control arrangement.
Figure 1B:
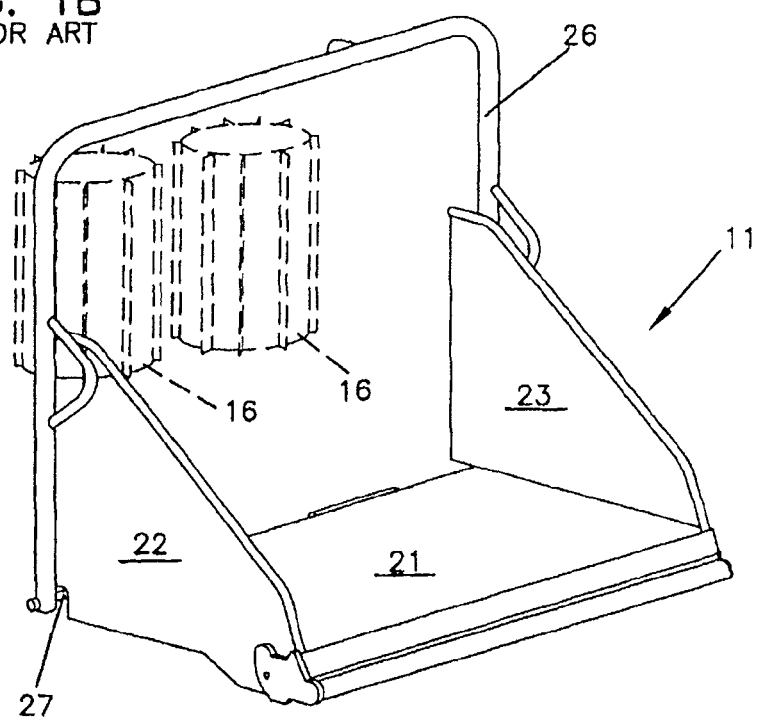
FIG. 1B is a perspective view of a portion of the chipper of FIG. 1A.
Figure 2:
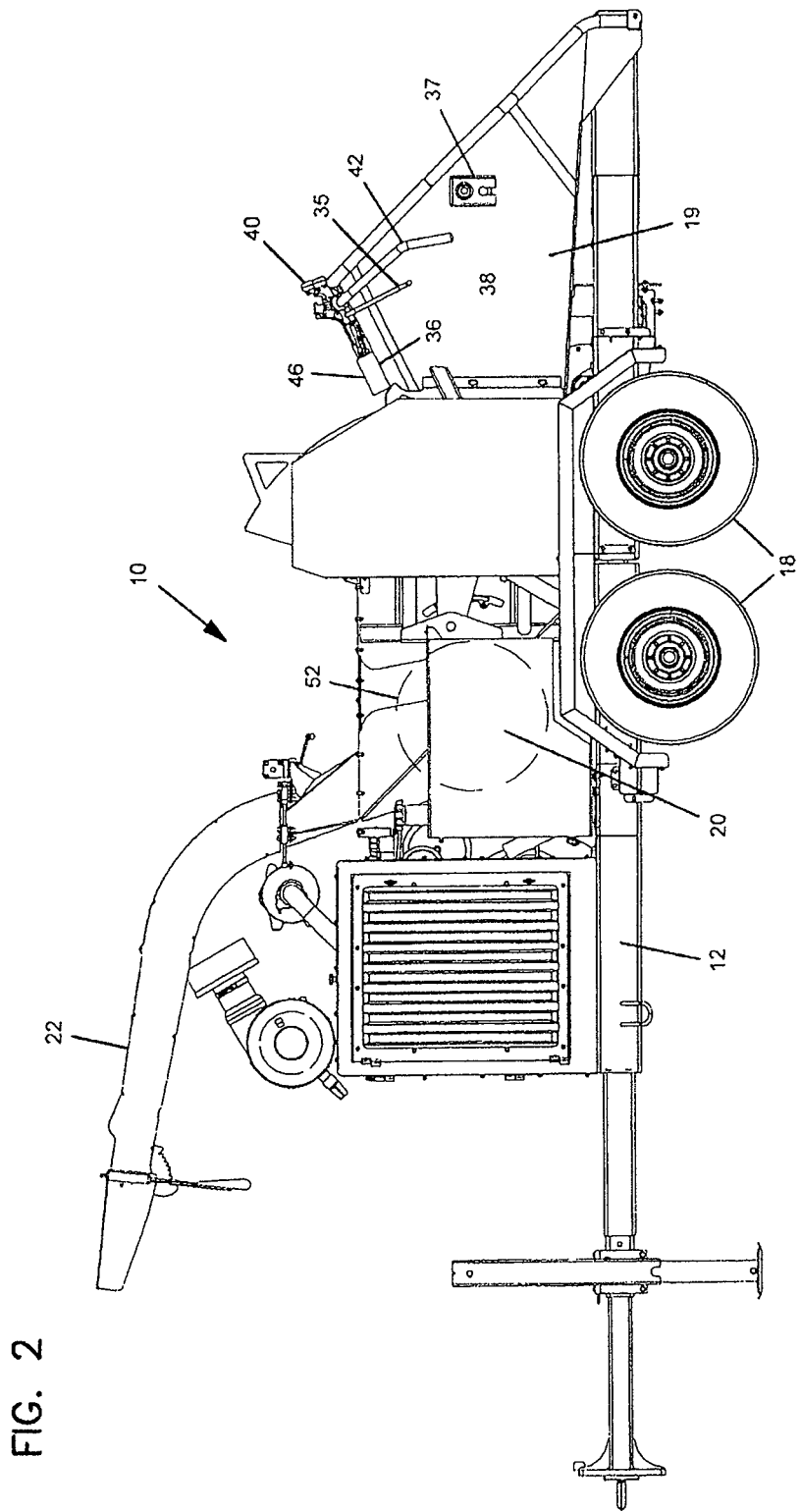
FIG. 2 is a side view of a chipper having a feed control arrangement according to an embodiment of the invention.

Referring to FIG. 2, a side view of a chipper is shown. In the depicted embodiment the chipper 10 is mounted to a frame 12 that is supported by wheels 18 which enable the chipper 10 to be conveniently moved. The depicted chipper 10 includes an infeed chute 19 (also referred to as a feed table) at the rear of the chipper 10, which facilitates the loading of materials to be chipped into the chipper 10. The material to be chipped can be any material that the user desires to reduce to chips. The material is most commonly brush and tree parts. Therefore, for convenience the material to be chipped will be referred to herein interchangeably as wood, trees, or brush. The chipper 10 includes feed rollers 50, 51 (shown in FIG. 3) that grab and pull brush from the infeed chute 19 into the body portion 20 of the chipper 10 which houses cutters 52 (shown in hidden lines) that cut the brush into small chips. The chips are then projected out of the chipper 10 through a discharge chute 22.

A detailed description of feed rollers is provided in a related application filed on May 10, 2007 titled WOOD CHIPPER FEED ROLLER, which is incorporated by reference herein (60/928,927). Likewise, a detailed description of cutters within the body portion 20 is provided in a related application filed on May 10, 2007 titled SYSTEM FOR CONTROLLING THE POSITION OF A FEED ROLLER, which is also incorporated herein by reference (60/928,926).

Figure 3:
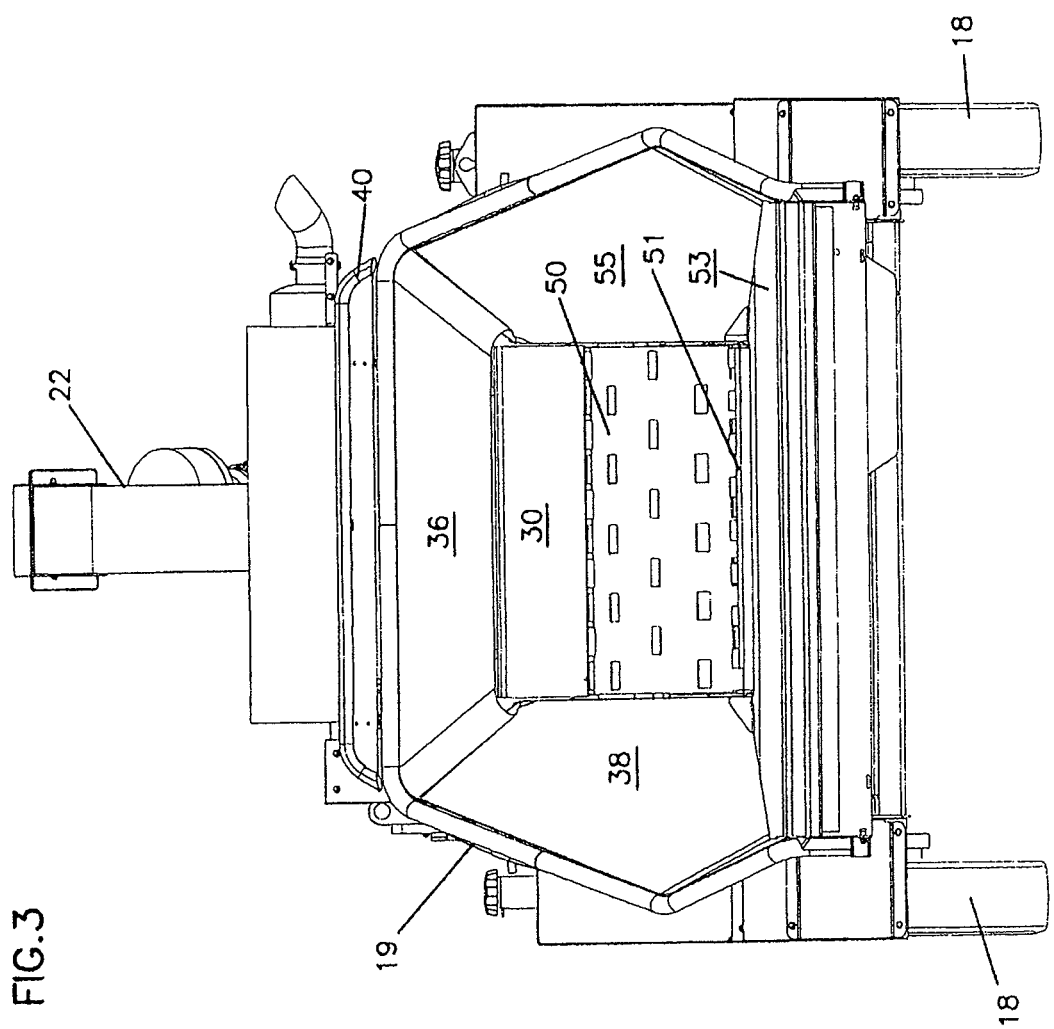
FIG. 3 is a rear view of the chipper of FIG. 2.
Figure 4:
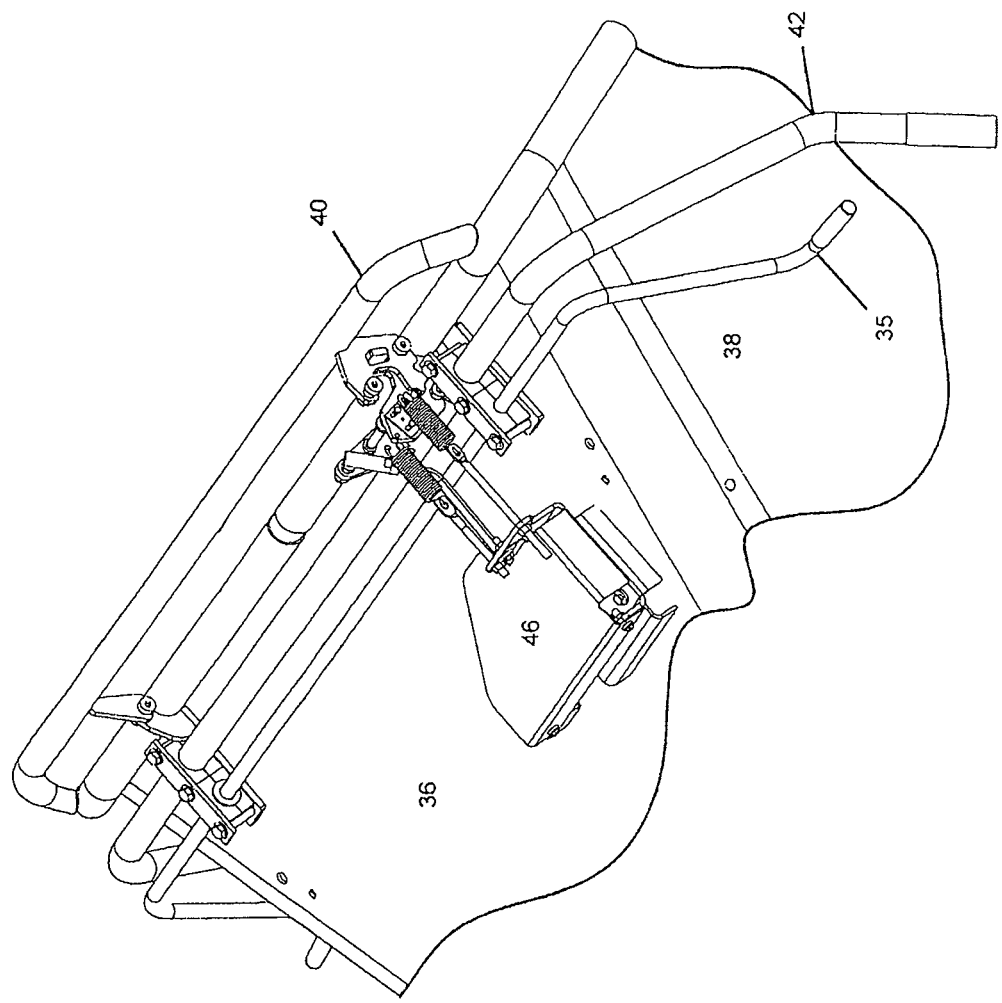
FIG. 4 is a top perspective view of the feed control arrangement of FIG. 2.
Figure 5:
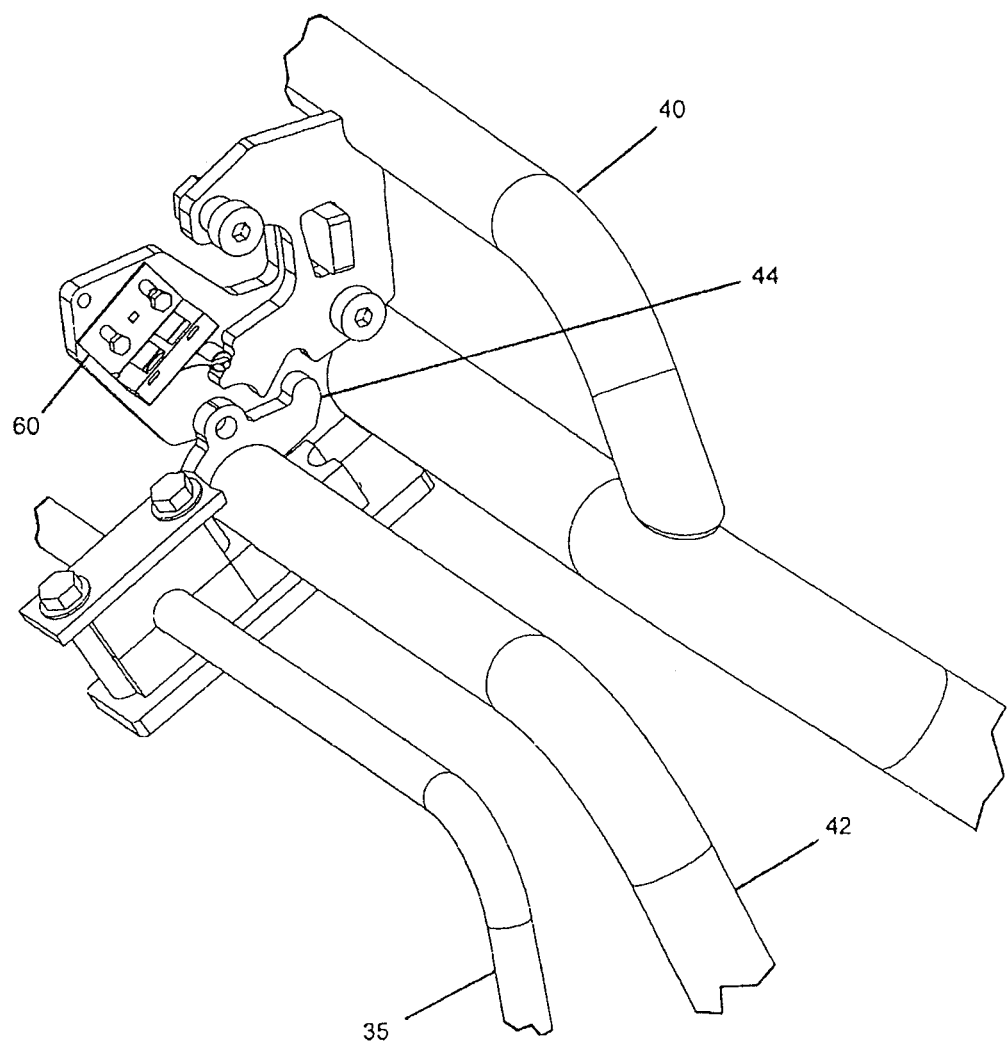
FIG. 5 is a perspective view of a portion of FIG. 4 with parts removed for clarity.

Referring to FIG. 3, the infeed chute 19 is constructed to funnel brush into the chipper 10. In the depicted embodiment the chute 19 includes a bottom surface 53, a top surface 36, a first side surface 38, and a second side surface 55. While in use, the chute 19 guides brush as it is pulled into the chipper 10. A detailed description of the infeed chute 19 is provided in a related application filed on May 10, 2007 titled WOOD CHIPPER INFEED CHUTE, which is incorporated by reference herein (60/928937).

Referring to FIGS. 4-8, a feed control arrangement is shown. The feed control arrangement includes an emergency stop bar 40 and a control lever 42. The emergency stop bar 40 is positioned across the top of the chute 19. The emergency stop bar 40 is shown in its normal disengaged position in FIGS. 4, 5, 6A, 6C, 6D, 7 and in an activated engaged position in FIGS. 6B and 8. In the engaged position the emergency stop bar 40 is rotated rearward and downward. The rearward direction is the direction away from the body 20 of the chipper towards the chute 19. The lever 42 is shown positioned forward relative to the opening of the feed chute 19. The configuration of the feed chute 19 and lever 42 prevents the lever 42 from being activated by brush that is pulled into the chute 19. In the depicted embodiments, the lever 42 includes a pivot portion that pivots about an axis, and a free end that can be moved back and forth like a pendulum. The free end is positioned below the stationary end, and the stationary end is positioned above the bottom surface 53 of the feed chute 19. In the depicted embodiment, the stationary portion of the lever 42 is positioned over a portion of the top surface 36 of the feed chute 19. The terms lever and bar are not used herein to refer to any particular geometric configuration. As used herein, the terms lever and bar refer to any structure that a human can grab onto and move.

Figure 6A:
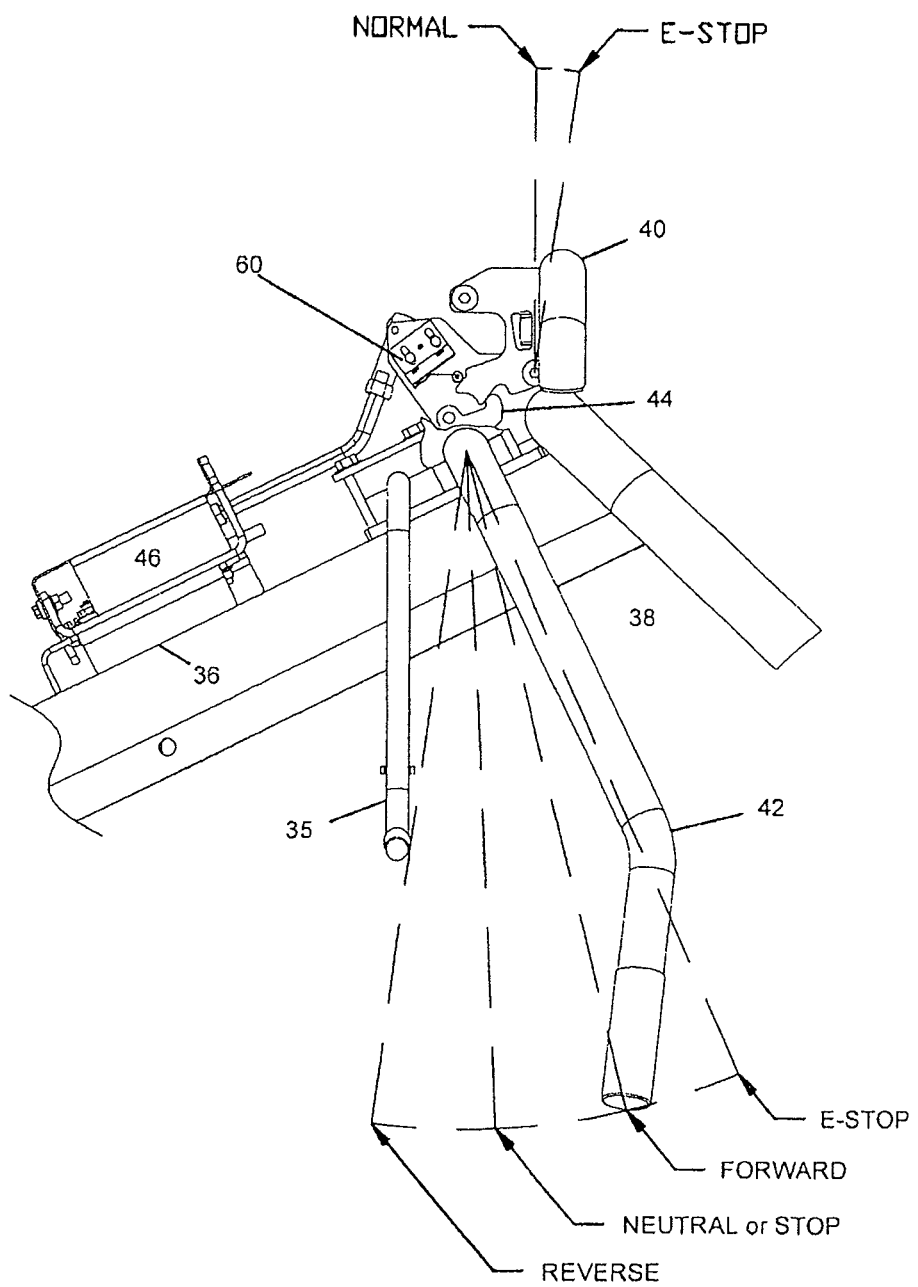
Figure 7:
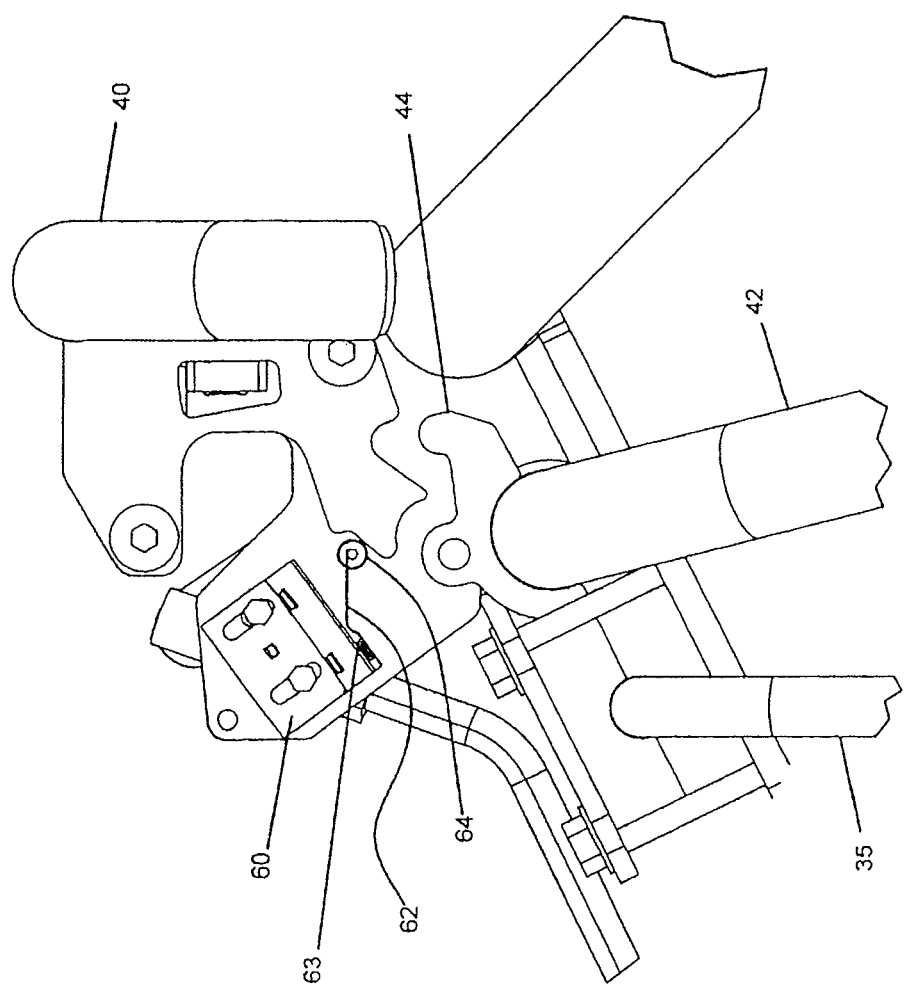
FIG. 7 is a side view of the feed control arrangement of FIG. 2 with parts removed for clarity in the normal position.
Figure 8:
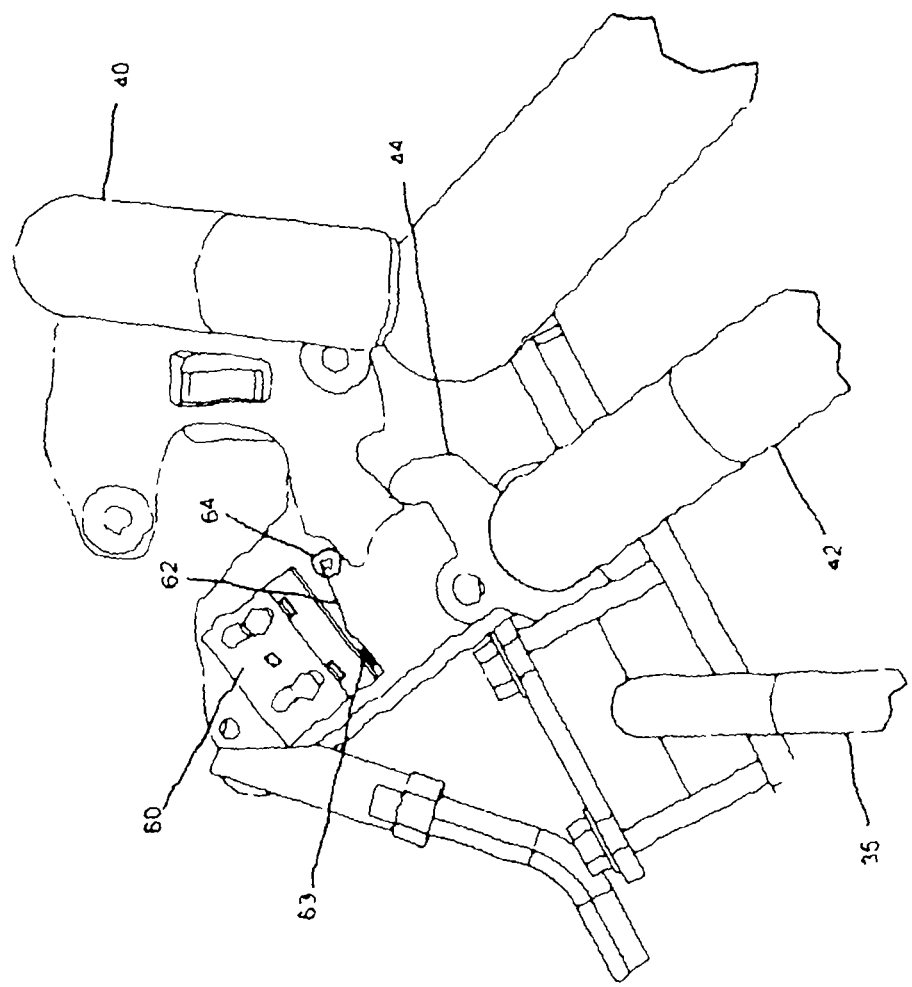
FIG. 8 is a side view of the feed control arrangement of FIG. 7 in an activated position.

The emergency stop bar 40 can be activated by physically pulling the bar from the normal position (FIGS. 4, 5, 6A, 6C-D, 7) to the activated position (FIG. 6B, 8). This mode of activation is provided so that the feed rollers can be quickly and easily stopped by an operator who, despite warnings and instructions, climbs onto the feed chute 19 and falls down or is grabbed by the feed rollers. The emergency stop bar 40 is designed to be activated by the operator pulling the bar rearward (towards the rear of the chipper). The emergency stop bar 40 is not designed to be activated when contacted by brush entering the chipper 10. Brush entering the chipper 10 would tend to push the bar 40 forward (towards the front of the chipper) or upwards. Therefore, the bar 40, if biased by brush, would remain in the deactivated normal position.

The emergency stop bar 40 can also be activated by moving the control lever 42. In the depicted embodiment moving the control lever 42 to the furthest position to the right (i.e., the rearward most position) causes the emergency stop bar 40 to move to the stop position (i.e., the activated position). In the depicted embodiment the emergency stop bar pivots about an axis located above the top surface 36 of the infeed chute 19. It should be appreciated that in alternative embodiments the emergency stop bar 40 (i.e., the activated position) could be activated by moving the lever to a different relative position.

In the depicted embodiment the control lever 42 includes a boss 44 that contacts a portion of the emergency stop bar 40. As the control lever 42 is moved to a stop position (FIGS. 6B, 8) the boss 44 biases the emergency stop bar 40 to the activated position. When the control lever 42 is pivoted counterclockwise to the E-stop position, the stop bar 40 rotates clockwise to the E-stopped position (activated position). In the depicted embodiment, the boss 44 does not cause the emergency stop bar 40 to move when the control lever 42 is moved to the forward, neutral, or reverse positions (FIGS. 6A, 6C, 6D). When the emergency stop bar is moved to the E-stop position either by pulling on the bar 40 itself or by moving the lever 42 rearward, power to the feed rollers 50, 51 is cut off. Moving the lever 42 to the neutral/stop position as shown in FIG. 6C also cuts the power to the feed rollers 50, 51. A difference between the neutral position (FIG. 6C) and the E-stop position (FIG. 6B) is that the feed roller 50, 51 will not restart from the emergency stop position unless the reset button 37 shown in FIG. 2 positioned on the side 38 of the chute 19 is pressed. From the neutral/stop position (FIG. 6C) the feed rollers 50, 51 can be reactivated by moving the lever to the forward or reverse positions without pressing the reset button 37.

In the depicted embodiment the control lever is mechanically coupled to a control box 46 that is mounted to the top surface 36 of the chute 19. The control lever 42 is configured such that there are four positions. The four positions from the right include E-stop, forward, neutral/stop, and reverse. As discussed above, the neutral/stop position shuts off or otherwise disengages the power to the feed rollers 50, 51. The neutral/stop position is between the reverse and forward positions. When pivoted counterclockwise, the control lever 42 moves to the forward position. In the forward position the feed rollers 50, 51 grab and pull brush into the chipper 10. When pivoted clockwise the control lever 42 moves to the reverse position. In the reverse position the feed rollers push brush out of the chipper. The reverse position is commonly used to clear jams. The E-stop position, like the neutral/stop position, either shuts off or otherwise disengages the power to the feed rollers 50, 51. As discussed above, to reactivate the feed rollers 50, 51 from the E-stop position the reset button 37 must be pressed.

The depicted embodiment also includes a secondary lever 35 which is used to adjust the position of the feed roller(s). In some embodiments, two feed rollers exist and the secondary lever 35 adjusts the spacing between the feed rollers.

Referring to FIGS. 7 and 8, the emergency stop switch 60 includes a switch arm 62, a switch arm roller 64, and a button 63. FIG. 7 shows the switch arm 62 extended and the button 63 in the normal position. FIG. 8 shows the switch arm 62 retracted and the button 63 depressed. Depressing the button 63 cuts power to feed rollers 50, 51.

Figure 9:
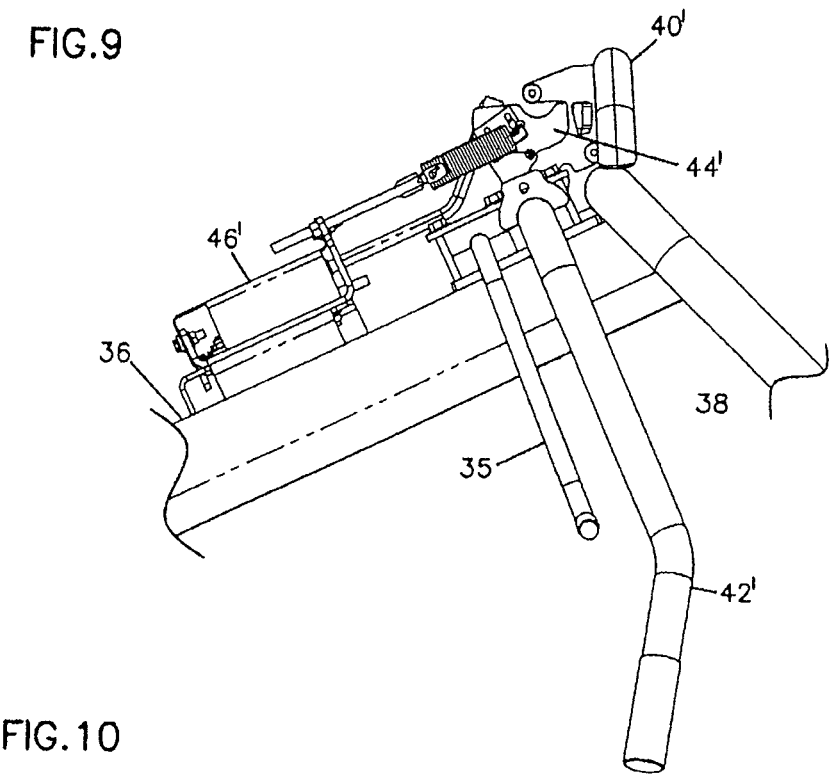
FIG. 9 is a side view of an alternative embodiment of the feed control arrangement of FIG. 2.
Figure 10:
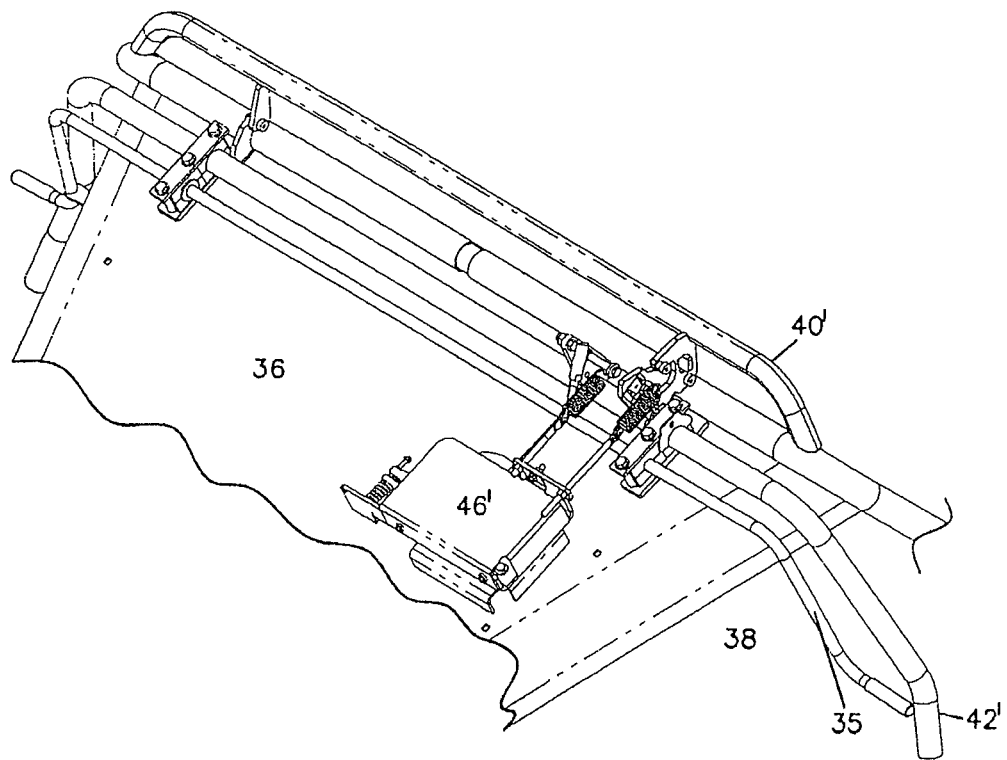
FIG. 10 is a top perspective view of the feed control arrangement of FIG. 9.

Referring to FIGS. 9 and 10, an alternative embodiment of the feed control arrangement is shown. In the depicted embodiment the control lever 42' engages a rear upper portion of the stop bar 40' instead of a rear lower portion, as shown in FIGS. 6A-D.

In the depicted embodiment, springs are used to bias the control lever 42, 42' in either the forward or neutral positions. In other words, the control lever 42, 42' needs to be held in the reverse position to cause the feed rollers to continue to rotate in the reverse direction. Likewise, the control lever 42, 42' is biased away from the stop position. The springs have been removed in some of the figures for clarity.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A chipper comprising:
    a body;
    an infeed chute connected to the first end of the body;
    a feed roller positioned to move materials to be chipped into the body;
    an emergency stop bar positioned across a top of the infeed chute; and
    a control lever for controlling the rotation of the feed roller positioned along a side of the infeed chute, wherein the control lever includes a free end that pivots about an axis located above the free end.

2. The chipper according to claim 1, wherein the emergency stop bar is located adjacent a top edge of the infeed chute.

3. The chipper according to claim 2, wherein the emergency stop bar pivots about an axis located above a top surface of the infeed chute.

4. The chipper according to claim 1, wherein the control lever pivots about an axis located above a top surface of the infeed chute.

5. The chipper according to claim 1, wherein the position of the control lever controls whether the feed roller is stopped or rotates.

6. The chipper according to claim 5, wherein a neutral position of the control lever is located between a forward position and a reverse position.

7. The chipper according to claim 6, wherein an E-stop position of the control lever is adjacent the forward position.

8. The chipper according to claim 5, wherein a neutral position and an E-stop position are separated by either a forward or a reverse position, wherein the feed control arrangement must be reset if the control lever is moved to the stop position.

9. The chipper according to claim 1, wherein the emergency stop bar and control lever are configured so that the emergency stop bar can move to the E-stop position without causing the control lever to move.

10. The chipper according to claim 9, wherein the emergency stop bar and control lever are configured so that moving the control lever can cause the emergency stop bar to move.

11. A feed control arrangement for a chipper comprising:
an infeed chute;
an emergency stop bar positioned adjacent a top edge of the infeed chute; and
a control lever positioned along a side of the infeed chute for controlling the direction of rotation of a feed roller,
wherein the control lever and emergency stop bar are configured such that they can move independently.

12. The feed control arrangement of claim 11, wherein the control lever and emergency stop bar are configured such that they can move together.

13. The feed control arrangement of claim 12, wherein the emergency stop bar is configured such that it can be activated without moving the control lever.

14. The feed control arrangement of claim 13, wherein the emergency stop bar is configured such that it can pivot without moving the control lever.

15. A feed control arrangement for a chipper comprising:
an infeed chute;
an emergency stop bar positioned adjacent a top edge of the infeed chute; and
a control lever positioned along a side of the infeed chute for controlling the feed of material into the infeed chute,
wherein the control lever and emergency stop bar are configured such that they can move independently and can also move together and wherein the emergency stop bar is configured such that it can be activated by moving the control lever.

16. The feed control arrangement of claim 15, wherein the emergency stop bar can be activated by pivoting the control lever.

17. The feed control arrangement of claim 16, wherein the control lever is configured such that it can be moved without activating the emergency stop bar.

18. A feed system for a chipper comprising:
a feed chute;
a feed roller adjacent the feed chute;
a drive system for powering the feed roller;
a control system for controlling the drive system, the control system including:
a feed direction control lever positioned on both sides of the feed chute;
an emergency stop lever positioned across the top of the feed chute; and
an emergency stop switch;
wherein the emergency stop switch can be activated by either moving the direction control lever or the emergency stop lever.

19. The feed control arrangement of claim 11, wherein the direction of rotation of a feed roller is selectably one of forward, reverse, and stationary.

\* \* \* \* \*